May 27, 1941.  W. A. RASOR  2,243,167
STRAW BINDER
Filed Aug. 9, 1938  3 Sheets-Sheet 1
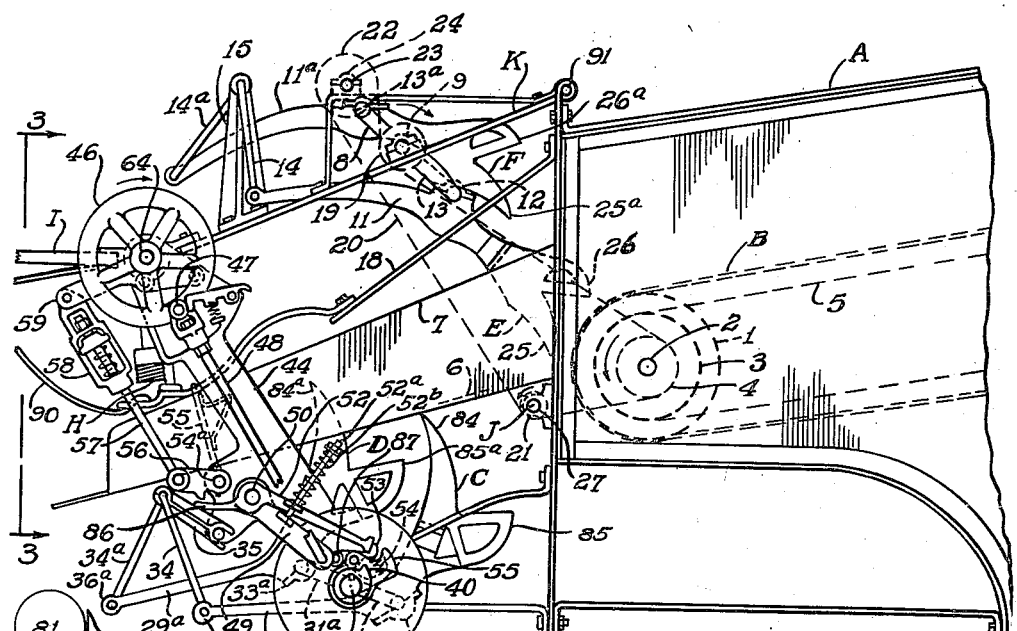
Fig.1.
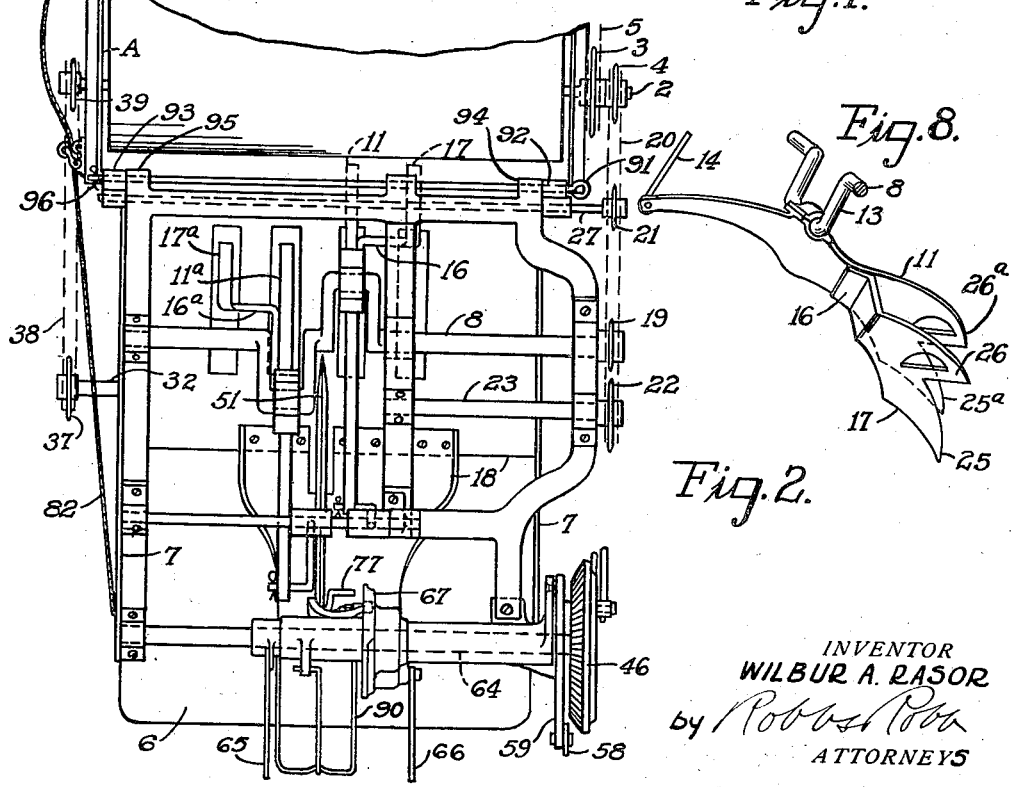
Fig.2.
Fig.8.
INVENTOR
WILBUR A. RASOR
by Robert Roba
ATTORNEYS

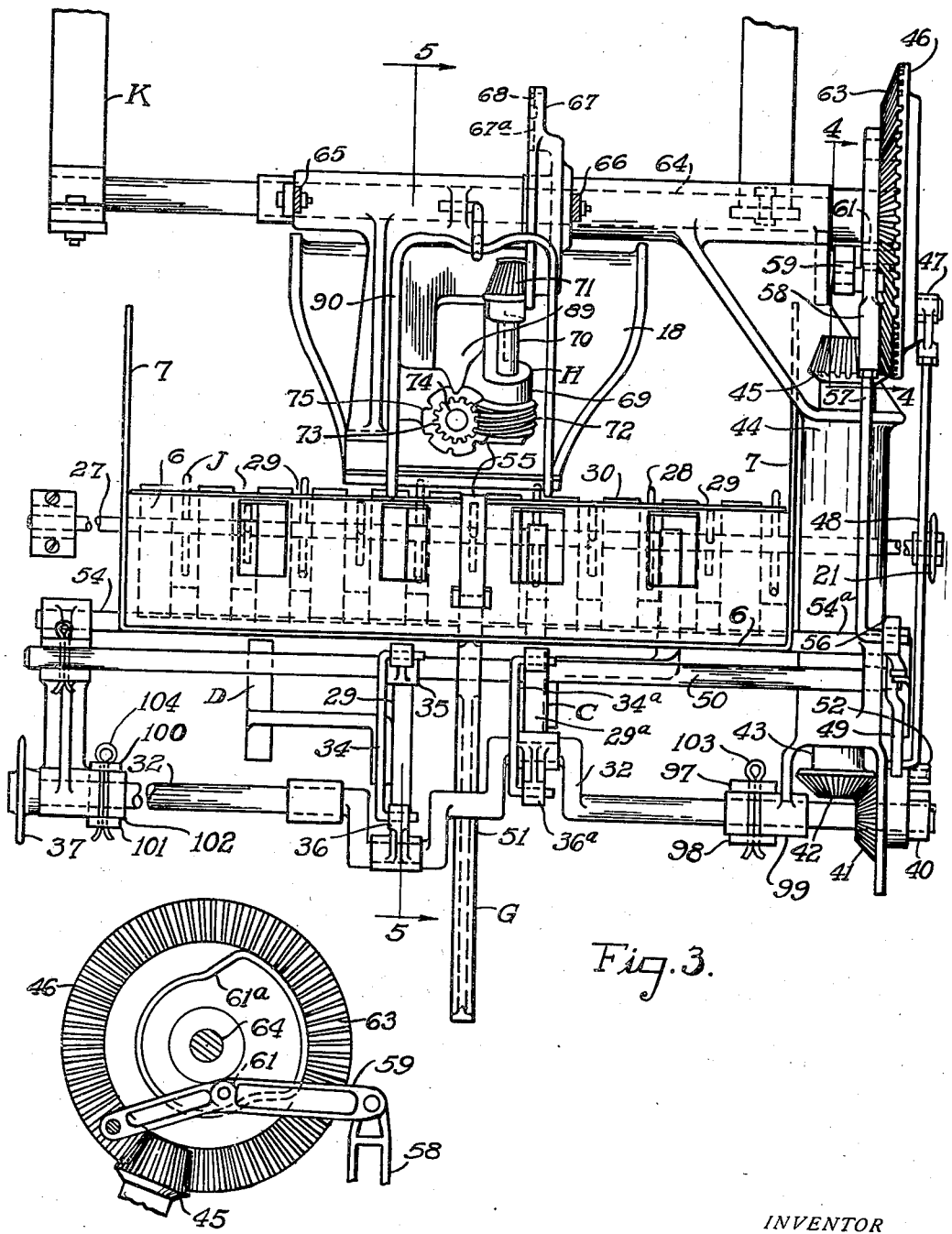

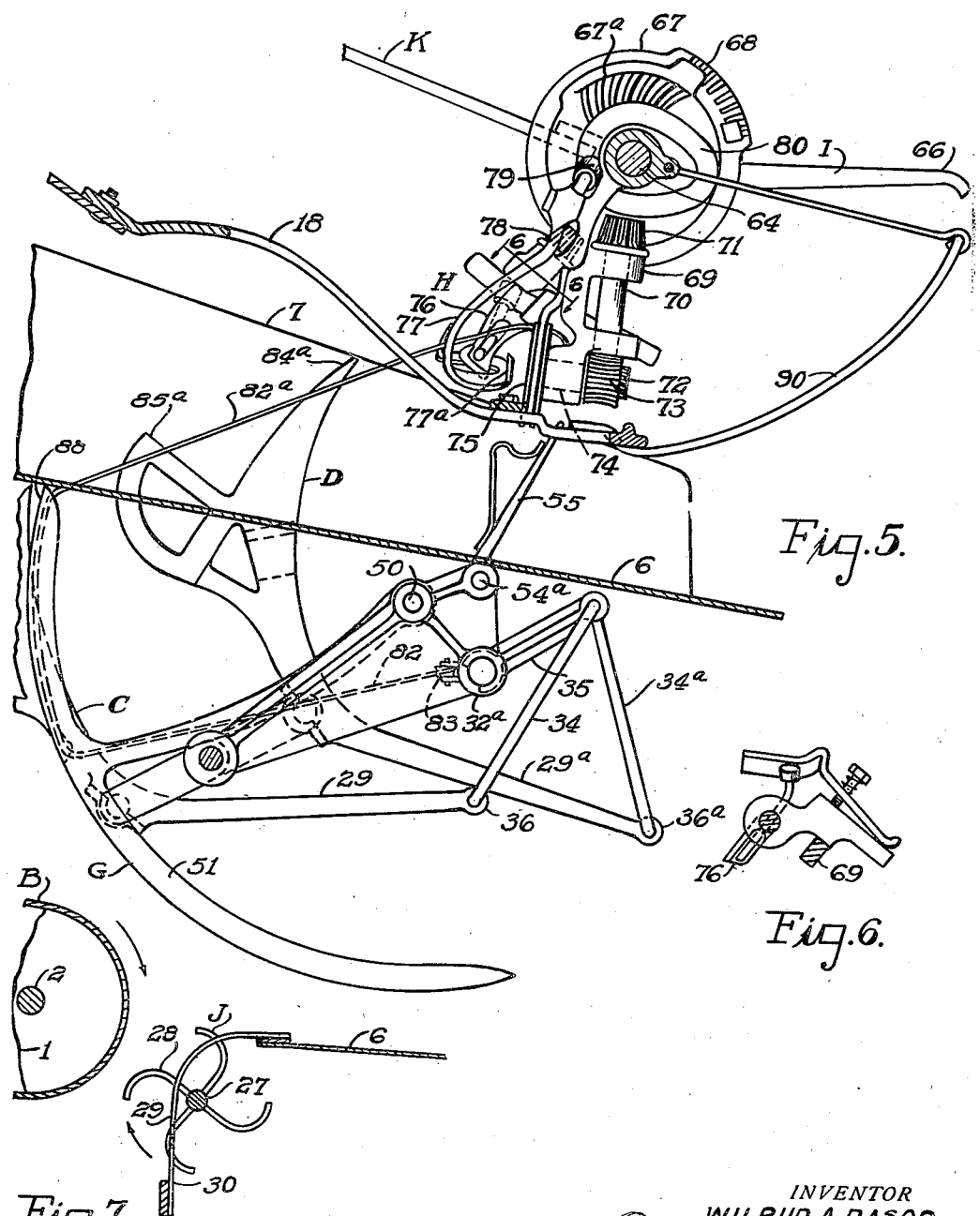

Patented May 27, 1941

2,243,167

UNITED STATES PATENT OFFICE 2,243,167

STRAW BINDER

Wilbur A. Rasor, Brookville, Ohio

Application August 9, 1938, Serial No. 223,917

5 Claims. (Cl. 56—471)

This invention relates to harvesting machinery, and more particularly to apparatus for binding straw into bundles or sheaves which apparatus is especially adapted to be used in conjunction with a combined reaper and threshing machine, commonly known as a combine, as an attachment therefor.

In the harvesting of grain, such as wheat, there is quite commonly used a machine which reaps and threshes the grain in one continuous operation, that is, which cuts the grain, conveys it to the threshing apparatus where it is separated from the straw and threshed, the straw being discharged onto an endless conveyer from which it is eventually discharged onto the ground. In this manner of harvesting, the straw discharged upon the ground largely becomes a waste product except in so far as it may be atttempted to be salvaged by subsequently raking it up off the field and conveying it to a place of use. Under such conditions of handling the straw, it becomes scattered upon the field and much of it lost to subsequent use because of lack of means for economically salvaging the same in its entirety.

Heretofore no practical apparatus has been developed for binding up straw discharged from the threshing apparatus, although many devices for this purpose have been proposed. Straw cannot be handled for binding in any manner similar to that in which grain, such as wheat, has long been successfully handled because of the fact that straw is discharged from a threshing machine in a more or less haphazard manner which is not conducive to binding the same in compact bundles as is true in reference to headed grain.

In other words, straw that has been separated from the grain, and passed through the threshing apparatus, is not placed upon the conveyer from whence it is discharged in any uniform manner, with its individual components neatly arranged, as is the case with cut wheat which is placed evenly and neatly upon the receiving platform subsequent to cutting, ready for feeding in a uniform manner into the threshing cylinder. In matter of fact, straw is discharged from the threshing apparatus in a tangled mass of light material which will not feed uniformly to a binder deck and defies any effort to pack it for bundling, by any apparatus heretofore proposed, and tends to clog between the end of the conveyer and adjacent portion of the binder deck so that movement of the conveyer is interfered with.

It is the primary object of the present invention to provide apparatus for binding straw into bundles whereby it may be efficiently and economically handled for subsequent use.

It is a further object of the invention to provide a binder attachment for combines which will efficiently handle straw discharged upon the binder deck to compact the same into tight bundles.

Another object of the invention is to provide means for preventing straw from clogging between the discharge end of the conveyer and the receiving end of the binder platform and for preventing the straw from adhering to the conveyer and being drawn beneath the same.

A further object is to provide means for handling straw deposited on the binder platform to move the same continuously and progressively along the platform to the binder instrumentalities without any stoppage.

Another important feature of the invention resides in the provision of a plurality of packer instrumentalities, certain of which act upon the straw to move the same into position for action by others, said instrumentalities acting progressively to move the straw in a continuous stream along the binder platform to the binder instrumentalities.

An important feature of the invention resides in the provision of dual sets of packers, one set acting upon the straw from below the binder deck and the other acting upon the same from above, whereby the entire body of straw may be acted upon to move the same along the deck and pressed into binding position with dispatch. To accomplish the compacting and progressive movement of the straw more efficiently, each set of packers comprises what may be termed dual packers which move as one.

A further important feature of the invention resides in the provision of agitator means between the discharge end of the conveyer and the binder deck which functions to enable the straw to be positively discharged upon the binder deck and prevents clogging thereof between the binder deck and conveyer and/or under the latter, by projecting the straw forcibly onto the binding deck.

Other objects and features of novelty of the invention will become apparent as the description thereof proceeds in conjunction with the drawings, in which:

Figure 1 is a side view of the binder attachment of my invention, shown attached in its operative relation to the discharge end of a combine.

Figure 2 is a top plan view of the binder attachment shown in Figure 1.

Figure 3 is an end view of the binder attachment looking in the direction of 3—3 of Figure 1.

Figure 4 is a view taken on the line 4—4 of Figure 3, illustrating the gear which actuates the knotter shaft.

Figure 5 is a vertical sectional view, taken on the line 5—5 of Figure 3, showing more in detail the knotter device and its actuating instrumentalities, the needle and packers.

Figure 6 is a view of a portion of the knotter device taken on the line 6—6 of Figure 5.

Figure 7 is a view showing the agitator means and its relation to the discharge end of the conveyer and the binder deck.

Figure 8 is a perspective view of one of the packer units.

Now describing the invention in detail, the letter A generally designates a combine, the rear end of which only is shown in Figure 1, in which is mounted an endless conveyer B trained over rollers 1, only one of which is shown, keyed to a shaft 2 to which is secured sprockets 3 and 4, sprocket 3 having trained thereover a chain 5 driven from a source of power not shown.

The binder attachment generally comprises a deck or platform 6 having sides 7, lower packer instrumentalities comprising two sets of dual packers C and D and operating mechanism later to be described, upper packer instrumentalities comprising two sets of dual packers E and F and operating mechanism later to be described, a needle G and operating mechanism later to be described, a knotter device generally designated H, and bundle discharge mechanism I, the knotter and discharge mechanism H and I having operating instrumentalities which will be described hereinafter, agitation means J, and a frame K.

The upper and lower packer instrumentalities operate progressively and continuously during the binding process. The needle, knotter and discharge instrumentalities operate at intervals when bundles are completed. The upper packer instrumentalities comprise a crank shaft 8 journaled in a bearing 9 carried by a frame K attached to the combine A. Packer sets E and F comprise curved arms 11 and 11a having bearing portions 12 through which crank portions 13 and 13a of the crank shaft 8 extend. Pivotally connected to the ends of said arms 11 and 11a are reciprocating links 14 and 14a respectively, the opposite ends of said links being pivotally connected to an up-standing bracket 15 carried by the frame K. The packer arms 11 and 11a are bifurcated at their opposite ends. Each of the said packer arms has rigidly attached thereto, as by brackets 16 and 16a, shorter packer arms 17 and 17a, respectively, similarly bifurcated at their ends. Each of the packer units C, D, E, and F is essentially the same, Figure 8 being exemplary.

The bifurcated portions of the packer arms move circularly through openings in the shield 18 when the crank shaft 8 is rotated, the said crank shaft having fixed thereto a sprocket 19 which is driven by means of a chain 20 trained over drive sprocket 4, agitator sprocket 21, idler sprocket 22, and against sprocket 19, idler sprocket 22 being fixed to a shaft 23 journaled in a bearing carried by a bracket 24 on frame k.

The sprocket 4, and consequently the chain 20, being driven in a counter-clockwise direction enables the sprocket 19, and consequently the crank shaft 8, to be driven in a clockwise direction so that the packers E and F are moved downwardly and rearwardly through their respective slots in the shield 18. As the bifurcated ends of the packers move in their circular orbits, the portions 25 and 25a first come into contact with the straw deposited upon deck 6 to move the same rearwardly. The portions 26 and 26a next contact the straw and move it further rearwardly. The units E and F act upon the straw alternately.

The agitator J, located just rearwardly of the discharge end of the conveyer B and just under the receiving end of the deck 6, comprises a spiked shaft, the numeral 27 designating the shaft and 28 the spikes, as seen best in Figures 3 and 7. The spikes rotate between the slotted portions 29 of a guard 30. The spiked shaft rotates in a clockwise direction, having reference to Figure 7, so that the curved spikes 28 catch the straw being discharged from the end of the conveyer B and project the straw onto the binder deck 6.

The lower packers C and D comprise the same elements as the upper packers, previously described, and it is, therefore, felt that no detailed description of them is necessary.

Each of the packers C and D comprise main packer arms 29 and 29a respectively to which are attached the shorter packer arms 30 and 30a respectively, the crank portions 31 and 31a of the crank shaft 32 extending through bearing portions 33 and 33a of packer arms 29 and 29a respectively. Crank shaft 32 is journaled in frame K in position somewhat rearwardly respecting crank shaft 9. Portions 84, 84a and 85, 85a of units C and D correspond to portions 25, 25a and 26, 26a, respectively, of units E and F.

Links 34 and 34a are pivotally secured to a bracket 35 and to the ends 36 and 36a respectively of the packer arms 29 and 29a. The crank shaft 32 has fixed thereto a sprocket 37 over which is trained a chain 38, driven from a sprocket 39, fixed to the opposite end of the conveyer shaft 2 from that to which sprockets 3 and 4 are secured. The bifurcated portions of the lower packer arms move circularly through openings in the lower deck when crank shaft 32 is rotated.

The crank shaft 32 has keyed thereto a cam 40, and freely rotatable upon said shaft is a bevel gear 41 which meshes with a bevel gear 42, fixed to one end of shaft 43 journaled in a hollow bearing 44. Fixed to the other end of shaft 43 is a bevel gear 45 meshing with the toothed portion 63 of a Geneva gear 46 fixed to shaft 64. The gear 46 is pivotally connected, as at 47, to a pitman 48, one end of which is connected to a lever 49 rigidly secured to a shaft 50 upon which is fixed, centrally thereof, the arm 51 of a needle G.

Loosely carried by the needle shaft 50 is a trip stop 52, one end of which engages a trip dog 53 which is normally held in engagement with the trip stop by action of a spring 54 contained in a trigger pocket 55. A trip stop spring member comprising a shaft 52a, extending through the trip stop 52, and attached to lever 49, normally maintains the trip stop 52 in position for engagement with the dog 53 by action of the spring 52b. The trip dog is keyed to the bevel gear 41.

A compressor shaft 54a has rigidly fixed thereto a trip lever 55 and a link 56 pivotally connected to a tension rod 57 having adjustably fixed thereto a cap sleeve 58. The said cap sleeve is pivotally connected to a link 59 which is pivotally connected to a second link 60 by a pivot roller 61 which rides on the inner periphery 61ᵃ of a Geneva gear 46.

Secured to shaft 64 art the discharge instrumentalities I, comprising arms 65 and 66. Referring now more particularly to Figure 5, there is also secured to shaft 64 a cam gear 67 having an inner toothed portion 67ᵃ and an outer toothed portion 68.

A conventional knotter unit H is secured to the shield 18, which comprises a frame 69 in which is journaled a shaft 70 to one end of which is fixed a bevel gear 71 and carries a worm 72 meshing with a worm gear 73 carried on a shaft 74 journaled in the frame, said shaft also carries the twine disc 75.

Rotatably journaled in the frame is a knotter hook 76, and movably carried by the frame is a stripper arm 77, carrying a knife 77ᵃ. The knotter hook 76 has fixed thereto a bevel gear 78 adapted to be engaged by the toothed portion 68 of the cam gear 66. The stripper arm 77 has a bearing portion 79 which rides in the guide portion 80 of the cam gear 66.

Carried at one side of the combine is a twine box 81 from which twine 82 is fed through a hole in the binder frame to a roller 83 secured to the crank shaft bearing 32ᵃ, through a hole in the needle arm 51, thence, centrally thereof, through the needle G to the stripper arm 77 and twine disk 75.

*Operation*

In operation, straw is discharged from the rear end of the conveyer B to the binder deck 6. The agitator J, whose shaft 27 is being driven in a counterclockwise direction, having reference to Figure 1, by the chain 20, brushes the straw leaving the conveyer B up onto the deck 6 and prevents any tendency of the straw to adhere to the conveyer and be carried beneath it and also prevents any tendency of the straw to clog between the discharge end of the conveyer and the receiving end of the deck 6. The crank shaft 8, operating the upper packers E and F, is also rotated by the chain 20, and the lower crank shaft 32, operating the lower packers C and D, is driven from shaft 2 by the chain 38 trained over the sprockets 39 and 37, the latter being fixed to shaft 32. It will be remembered that the crank shafts 8 and 32 are positioned in different vertical planes respecting the plane of the binder deck and that rotation of said shafts causes the bifurcated portions of the packers to move in circular orbits.

With the packers in operation, straw received upon the deck 6 will first be acted upon by the upper packers E and F, the portions 25 and 25ᵃ thereof first contacting the straw to move it rearwardly and the portions 26 and 26ᵃ thereof next coming into contact therewith as their movement through the circular orbit progresses. As the straw is moved rearwardly, it is next acted upon by the lower packers C and D, the portions 84 and 84ᵃ thereof first contacting the straw, and then portions 85 and 85ᵃ thereof acting to move the straw still further rearwardly. Units E and F, act upon the straw alternately as do the units C and D.

The action of the upper and lower packers is to move the straw progressively rearwardly as the respective bifurcated portions of the various packers come into contact therewith. This results in compressing the straw into a tight bundle against the portion of the twine 82ᵃ extending between the end of the needle G and the knotter bill 77, moving the said portion of the twine rearwardly until the bundle of straw has become sufficiently large that it compresses or moves the trip lever 55 in a rightward direction, having reference to Figure 5, or in a leftward direction, having reference to Figure 1. Compressing of the trip lever 55, as described, rotates the shaft 54, and consequently the lever 56, in a counterclockwise direction, referring to Figure 1, against the tension of the tensioner 57. Rotation of the lever 56 causes engagement thereof with an abutment portion 86 of the trip stop 52 which causes release of the same from engagement with the trip dog 53, when the lever 55 has been sufficiently compressed.

Upon release of the trip dog 53, an abutment portion 87 thereof is pressed into engagement with the face of the cam 40 by action of the spring 54. Through this engagement, the shaft 32 rotates the bevel gear 41, shaft 43, and Geneva gear 46, the latter causing the pitman 48 to move upwardly actuating lever 49 which causes rotation of the needle shaft 50, causing the end 88 of the needle G to pass through an opening or eye 89 in the frame 69 of the knotter H.

At this point the shaft 64 has been rotated sufficiently to bring the toothed portion 67 of the cam gear 66 into engagement with the bevel gear 71, rotating shaft 70, worm 72 and twine disk 75, after which the toothed portion 68 of the cam gear 66 engages the bevel gear 78 rotating the knotter hook to tie a knot in the twine, after which the twine is severed from the end of the needle by the knife 77ᵃ as the stripper arm 77 is moved by engagement of a cam, located centrally of the cam gear 66, with the bearing 79 of said stripper arm.

By this time the discharge arms I have been rotated sufficiently by the shaft 64 to engage the tied bundle of straw and discharge the same from the rear of the deck 6. Upon discharge of the bundle, pressure on the trip lever 55 is released and the same is restored to its normal position, indicated in Figures 1 and 5, by action of the tensioner 57. Thereupon the gear 46 having made a complete revolution, and having restored the pitman 48 to the position shown in Figure 1, the trip stop 52 will again engage the trip dog 53 to release the abutment portion 87 thereof from engagement with the cam 40. Shaft 32 will now rotate with the bevel gear 41 idle.

From the description of the invention herein given, it will be seen that there is provided a binder attachment for combines which utilizes a spiked agitator for insuring the proper transfer of the straw from the discharge end of the conveyer to the binder end of the deck, eliminating any possibility that light straw will adhere to the conveyer and be carried therebeneath, or that straw will become clogged between the conveyer and binder deck.

The guard 30 prevents straw from being passed beneath the binder deck 6 and the spikes 28 of the agitator knick the straw up onto the deck 6. The action of the upper and lower packers is such that the straw is continuously moved rearwardly against the twine by which it is to be tied into bundles, through progressive engagement of the contacting portions of the respective packer instrumentalities.

During discharge of a bundle from the deck 6 by discharge arms 65 and 66 straw is prevented from being carried upwardly by said arms by contact of guard 90 with said straw.

It will be apparent to those skilled in the art that the binder attachment of the present invention is adapted for use with any type of combine whether the latter employs a conveyer of the endless belt or shaker type or any other type.

The entire binder unit is readily detachable from the combine, if desired, since it is entirely supported on the combine at four points. The attaching means comprises a rod 91 passing through eye extensions 92 and 93 of the combine frame, as well as eye extensions 94 and 95 of the binder frame k, said rod being secured in position by a cotter-pin 96 extending through a hole in the end of the rod. The rod 91 supports the binder attachment from the top.

An extension of the combine frame comprising two forks supports the binder attachment at the bottom and rearwardly. The portions 97 and 98 of one of these forks receive between them the sleeve bearing 99 of the frame K, and the portions 100 and 101 of the other fork receive between them the sleeve bearing 102 of the frame K. The lower crank shaft 32 is journaled in the bearings 99 and 102. A cotter-key 103 passing through holes in the portions 97 and 98 of the first fork retains the bearing 99 therein. A cotter-key 104 passing through holes in the portions 100 and 101 of the other fork retains the bearing 102 therein.

When it is desired to detach the binder from the combine the cotter-key 96 is removed and the rod 91 withdrawn. Then the cotter-keys 103 and 104 are removed and the whole attachment withdrawn rearwardly, so that the bearings 99 and 102 are out of engagement with the forks.

It may be noted that the action of the packer units is to straighten the straw as they move it rearwardly. This is due to the fact that said units comprise spaced arms engaging the straw at spaced points so as to move the body of straw evenly. This is an important factor in the successful performance of the binder construction of the present invention.

Having thus described my invention, what I claim as new and desire to secure by Letters Patent of the United States is:

1. In a straw binder, in combination, a receiving deck upon which straw in disarranged condition is to be received, said deck being provided with openings therein equidistantly spaced transversely from opposite sides of said deck, alternately movable upper packer arms supported above said deck and equidistantly spaced transversely from opposite sides thereof, means for alternately moving said upper arms toward and substantially adjacent to, and away from, as well as longitudinally of, said deck, alternately movable lower packer arms supported below said deck, each of said lower arms being operable through one of the aforesaid openings in said deck, and means for alternately moving said lower arms vertically through their respective openings and longitudinally of said deck, whereby said packers will act upon disarranged straw received upon said deck to straighten and progressively move said straw along said deck into condition for binding.

2. In a straw binder, in combination, a receiving deck upon which straw in disarranged condition is to be received, said deck being provided with openings therein equidistantly spaced transversely from opposite sides of said deck, alternately movable upper packer arms supported above said deck and equidistantly spaced transversely from opposite sides thereof, means for alternately moving said upper arms toward and substantially adjacent to, and away from, as well as longitudinally of, said deck, alternately movable lower packer arms supported below said deck, each of said lower arms being operable through one of the aforesaid openings in said deck, an auxiliary packer arm associated with each of the aforesaid packer arms to move therewith and transversely spaced therefrom, and means for alternately moving said lower arms vertically through their respective openings and longitudinally of said deck, whereby said packers will act upon disarranged straw received upon said deck to straighten and progressively move said straw along said deck into condition for binding.

3. In a straw binder of the class described, a receiving deck provided with openings therein equidistantly spaced transversely from opposite sides of said deck, agitator means positioned at the receiving end of said deck for engaging straw in disarranged condition fed thereto and transferring said straw onto said deck, alternately movable upper packer arms supported above said deck and equidistantly spaced transversely from opposite sides thereof, means for alternately moving said upper arms toward and substantially adjacent to, and away from, as well as longitudinally of, said deck, alternately movable lower packer arms supported below said deck, each of said lower arms being operable through one of the aforesaid openings in said deck, and means for alternately moving said lower arms vertically through their respective openings and longitudinally of said deck, whereby said packers will act upon disarranged straw received upon said deck to straighten said straw and progressively move the same along said deck into condition for binding.

4. In a straw binder, in combination, a receiving deck upon which straw in disarranged condition is to be received, means at the opposing transverse edges of said deck for confining straw received upon said deck between said transverse edges, said deck being provided with openings therein equidistantly spaced transversely from opposite sides of said deck, alternately movable upper packer arms supported above said deck and equidistantly spaced transversely from opposite sides thereof, means for alternately moving said upper arms toward and substantially adjacent to, and away from, as well as longitudinally of, said deck, alternately movable lower packer arms supported below said deck, each of said lower arms being operable through one of the aforesaid openings in said deck, and means for alternately moving said lower arms vertically through their respective openings and vertically substantially entirely through the straw received upon said deck and longitudinally of said deck, whereby both the upper and lower arms will be caused to move vertically substantially entirely through the disarranged straw received upon said deck and to straighten and progressively move said straw along said deck into condition for binding.

5. In a straw binder of the class described, a receiving deck provided with openings therein equidistantly spaced transversely from opposite sides of said deck, agitator means positioned at the receiving end of said deck for engaging straw in disarranged condition fed thereto and transferring said straw onto said deck, means at the opposing transverse edges of said deck for confining straw received upon said deck between said transverse edges, alternately movable upper packer arms supported above said deck and equidistantly spaced transversely from opposite sides thereof, means for alternately moving said upper arms toward and substantially adjacent to, and away from, as well as longitudinally of, said deck, alternately movable lower packer arms supported below said deck, each of said lower arms being operable through one of the aforesaid openings in said deck, and means for alternately moving said lower arms vertically through their respective openings and vertically substantially entirely through the straw received upon said deck and longitudinally of said deck, whereby both the upper and lower arms will be caused to move vertically substantially entirely through the disarranged straw received upon said deck to straighten said straw and progressively move the same along said deck into condition for binding, said agitator means and said packer arms being so arranged that certain of the latter will move into position immediately adjacent said agitator means to engage straw discharged upon the deck thereby and move said straw so discharged into position for action thereupon by other of said packers.

WILBUR A. RASOR.